US008252188B1

(12) United States Patent
Batten et al.

(10) Patent No.: US 8,252,188 B1
(45) Date of Patent: Aug. 28, 2012

(54) F.O.G. SEPARATOR CONTROL

(75) Inventors: William C. Batten, Asheboro, NC (US);
Bruce W. Kyles, Asheboro, NC (US)

(73) Assignee: Thermaco, Inc., Asheboro, NC (US)

(*) Notice: Subject to any disclaimer, the term of this patent is extended or adjusted under 35 U.S.C. 154(b) by 0 days.

(21) Appl. No.: 12/942,539

(22) Filed: Nov. 9, 2010

Related U.S. Application Data

(62) Division of application No. 12/121,861, filed on May 16, 2008, now Pat. No. 7,828,960.

(60) Provisional application No. 60/938,317, filed on May 16, 2007.

(51) Int. Cl.
*C02F 1/40* (2006.01)

(52) U.S. Cl. .................. 210/742; 210/744; 210/776

(58) Field of Classification Search .............. 210/86, 210/104, 525, 115, 538, DIG. 5, 742, 744, 210/776; 73/295
See application file for complete search history.

(56) References Cited

U.S. PATENT DOCUMENTS

| | | | |
|---|---|---|---|
| 3,025,962 A | 9/1958 | Williams | 219/86 |
| 3,279,252 A | 10/1966 | Barlow | 73/295 |
| 3,923,655 A | 12/1975 | McKinney | 210/83 |
| 4,785,665 A | 11/1988 | McCulloch | 73/295 |
| 4,832,711 A | 5/1989 | Christel, Jr. et al. | 55/20 |
| 5,234,527 A | 8/1993 | Nozawa et al. | 156/345 |
| 5,360,555 A | 11/1994 | Batten | 210/803 |
| 5,431,826 A | 7/1995 | Becker et al. | 210/742 |
| 5,705,055 A | 1/1998 | Holloway, Jr. et al. | 210/115 |
| 5,730,026 A | 3/1998 | Maatuk | 73/295 |
| 5,935,449 A | 8/1999 | Buchler et al. | 210/742 |
| 6,014,076 A | 1/2000 | Luzzader | 340/521 |
| 6,491,830 B1 | 12/2002 | Batten et al. | 210/803 |
| 6,517,715 B1 | 2/2003 | Batten et al. | 210/232 |
| 6,619,118 B1 | 9/2003 | Keck | 73/304 C |
| 6,776,037 B2 | 8/2004 | Maatuk | 73/295 |
| 6,879,935 B2 | 4/2005 | Keck | 702/168 |
| 6,951,615 B2 | 10/2005 | Tripodi et al. | 210/744 |
| 6,973,828 B2 | 12/2005 | Zimmermann et al. | 73/295 |
| 7,186,346 B1 | 3/2007 | Batten et al. | 210/776 |
| 7,208,080 B2 | 4/2007 | Batten et al. | 210/86 |
| 7,367,459 B2 | 5/2008 | Batten et al. | 210/521 |
| 7,828,960 B1 | 11/2010 | Batten et al. | 210/86 |
| 2005/0126282 A1* | 6/2005 | Maatuk | 73/295 |

OTHER PUBLICATIONS

Thermistor from Wikipedia, 5pp, undated related technology.
Thermocouple from Wikipedia, 5 pp., undated related technology.

* cited by examiner

*Primary Examiner* — Nam Nguyen
*Assistant Examiner* — Paul J Durand
(74) *Attorney, Agent, or Firm* — MacCord Mason PLLC

(57) ABSTRACT

A separator for separating F.O.G. from an effluent that contains F.O.G. includes a tank, an inlet to the tank for receiving effluent that contains F.O.G., and an outlet to allow grey water to leave the tank. The tank has a size to enable stratification of a layer of F.O.G. present in the tank on water in the tank, and first and second thermocouples are positioned at differing levels in the tank. Conductors couple the thermocouples to sensors, and differing voltages in the thermocouples can be sensed to determine if the thermocouples are surrounded by F.O.G. or water.

17 Claims, 5 Drawing Sheets

F.O.G. SEPARATOR CONTROL

This application is a division of utility application Ser. No. 12/121,861 filed May 16, 2008, now U.S. Pat. No. 7,828,960, which claims the benefit of the filing date of provisional application 60/938,317 filed May 16, 2007.

BACKGROUND OF THE INVENTION

Oil, grease and solid waste contaminant removal or recovery systems are well known in the prior art. Over the past thirty years there has been a steady move towards requiring food handling facilities to have systems for servicing kitchen grease and solid waste bearing water flows. Sewer system lines can become clogged from the fats, oil and grease waste materials (hereinafter referred to as "F.O.G.") put into the sewer system from food handling facilities. This has led more and more sewer authorities to implement fats, oils and grease control programs. These programs regulate food handling facilities and the manner in which they process F.O.G.s. The object of many of these programs is to ensure that food handling facilities remove as much of the F.O.G. as possible from the effluent flow, thereby releasing only grey water to the sewer system.

Active separators remove F.O.G. from the effluent, typically by some skimming operation. Skimming when skimming is required and not skimming when it is not required is an issue that has not yet been precisely addressed by the art. The traditional methodology is simply to use a timer that turns on the skimming apparatus at a certain time of day and runs it for a certain period, providing the user only with control as to the time of day and duration. For installations that have very regular schedules, this may be sufficient. However, for other installations that operate on less than a regular schedule, problems can arise. Schedule variations can be as simple as the differences between weekday and weekend operation. Also, for installations such as school cafeterias that do not operate during the summer, F.O.G. will not be added to the effluent during the summer, so there is not a reason to run the separator during the summer. Nonetheless, if the separator works on a daily schedule according to its timer, it will run even if there is no F.O.G. to be removed.

One of the downsides of this operation, besides the wasted energy of skimmer operation, is that when all of the F.O.G. is removed, the water becomes exposed. There may be food solids remaining in the water that are decomposing and off-gassing foul odors. If a F.O.G. mat is allowed to remain on the water, the odor is contained within the water. Also, humidity emanating from the water can rise into the electronics and provide a challenge to the longevity of the electronics.

SUMMARY OF THE INVENTION

The present invention fulfills one or more of these needs in the art by providing a separator for separating F.O.G. from an effluent that contains F.O.G. including a tank, an inlet to the tank for receiving effluent that contains F.O.G. and an outlet to allow grey water to leave the tank, the tank having a size to enable stratification to form a layer of F.O.G. in the tank on top of water in the tank. First and second thermocouples are located at differing levels in the tank, and conductors couple the thermocouples to a control box. The control box reads differing voltages in the thermocouples to determine if the thermocouples are surrounded by F.O.G. or water.

Typically, the tank has a top and the thermocouples are mounted on rods that extend down from the top. The thermocouples may be mounted at lower ends of their respective rods, with the first rod being longer than the second rod. In some embodiments, the tank has a defined capacity for holding F.O.G. and a first rod positions a thermocouple at a level where the tank is considered to be 75% of the defined capacity, and a second rod positions a thermocouple at a level where the tank is considered to be 50% of the defined capacity.

In one embodiment the thermocouples may have conductors extending to a connector, whereby an output box may be selectively connected to the connector for periodic sensing to determine if the thermocouples are surrounded by F.O.G. or water. The output box can be considered a part of the novel combination, and if so, the output box is typically configured to periodically input a current to heating elements at the thermocouples and a volt meter in the box connected to the thermocouples measures the output voltages of the thermocouples.

In another embodiment the separator has a skimmer and the control system that acts on the sensed voltages determines when to skim. If the separator has a skimmer, the control system may actuate the skimmer when the thermocouple on the first rod is surrounded by F.O.G. In a separator that has a skimmer, the system can be used with only one thermocouple and a timer. The thermocouple's sensing of F.O.G. can indicate when skimming is to commence, and the time can be used to terminate skimming after a pre-defined interval.

The invention can also be considered as a method including in sequence taking a first measure of the temperature of two thermocouples in the tank, applying heat to the two thermocouples in the tank for a fixed period of time, taking a second measure of the temperature of two thermocouples in the tank. Differences in the first and second measures of the temperature for the two thermocouples are then evaluated. For each thermocouple, if the difference in the first and second measures of the temperature for that thermocouple is below a threshold, the method includes generating a signal indicative that the thermocouple is immersed in water in the tank. If the difference in the first and second measures of the temperature for that thermocouple exceeds the threshold, the method proceeds as generating a signal indicative that the thermocouple is immersed in F.O.G.

Preferably, taking the measures comprise measuring a voltage across the thermocouple.

If the difference in the first and second measures of the temperature for thermocouple exceeds a second, higher threshold, the method can include generating a signal indicative that the thermocouple is immersed in air. Further, it can include signaling an alarm in response to a signal indicative that one of the thermocouples is immersed in air.

The method may also include operating a skimmer to skim F.O.G. from water in the tank in response to a signal indicative that one of the thermocouples is immersed in F.O.G. In another embodiment method may include removably coupling an output box to an electrical connector on the tank to input a current to a heater in the tank and to measure output voltages of the thermocouples, and evaluating differences in the first and second measures of the temperature for the two thermocouples is accomplished using the output voltages at the output box. The method can also include terminating skimming after a predefined time interval, rather than upon sensing with a second thermocouple.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

The preferred embodiment provides a F.O.G. separator with a control system that senses a F.O.G. trap layer sensor using thermocouples. The preferred embodiment has two rods that are suspended from the ceiling of a grease trap or other passive separator, such as Thermaco's Trapzilla® F.O.G. separator shown in FIGS. 2 and 3. It can also be used with active separators that do skimming, such as Thermaco's Big Dipper® separators shown in FIG. 1. As used in this application, "skimming" includes other ways of taking the F.O.G. off the top, including opening spouts that drain the F.O.G. (see U.S. Pat. No. 7,186,346 for examples), pumping the F.O.G. (see U.S. Pat. No. 6,517,715 for an example), or other active methods.

Rods 12, 14 are of differing length, and each has at its end a thermocouple and heater. Each thermocouple and heater has wires that travel inside the respective rods to a control box 18 in the embodiment of FIG. 1 in the roof of the unit. The control box 18 is configured to periodically input current to the heating element. A volt meter in the box 18 on the output lines of the thermocouple measures the output voltage of the thermocouple. For the embodiments of FIGS. 2 and 3, the control box can be selectively connected through the connector 17 in the roof of the unit.

The thermocouple output voltage varies with its temperature, and its temperature response to the applied voltage varies with the dissipation of heat from the heater into the surrounding liquid. If the liquid is water, the heat dissipation from the heater is at a faster rate than if the heater is located in F.O.G. so if the thermocouple is in F.O.G. its temperature will rise faster than if it is in water. If the heater is in air, the temperature rise is much faster yet. Thus, the temperature rise of the thermocouple and, hence its output voltage, will vary depending on whether the thermocouple is immersed in air, water or F.O.G. This difference is sufficient to enable control or output box 18 to identify whether one or more of the thermocouple probes is located in air, F.O.G. or water.

Figure 1:
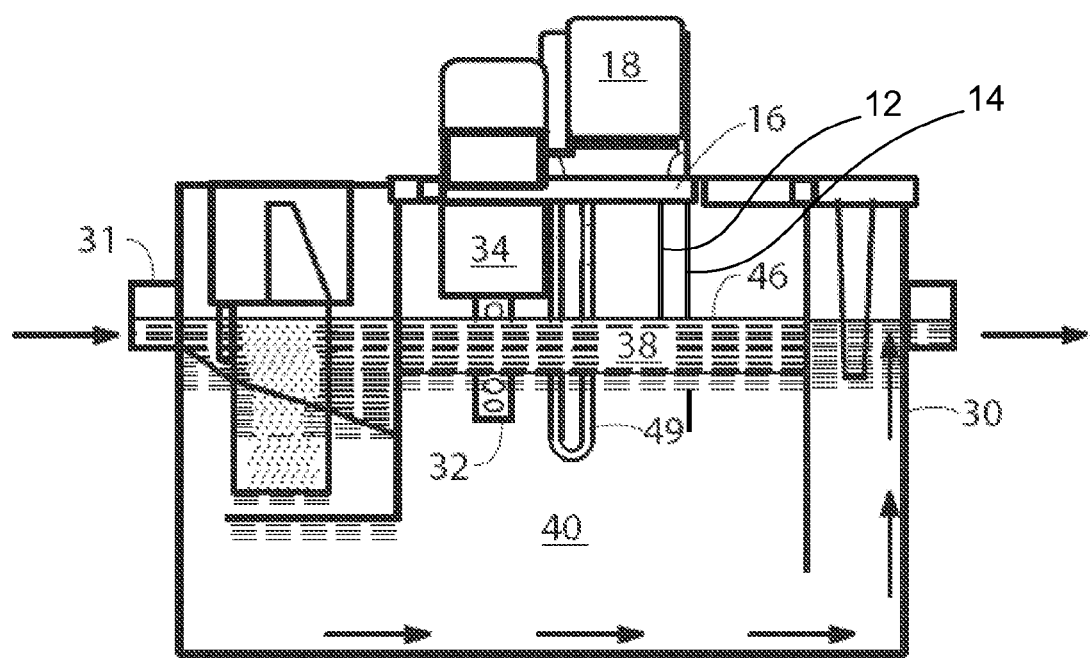
FIG. 1 is a schematic view of an active F.O.G. separator equipped with an embodiment of the invention.

The thermocouples are useful on the active F.O.G. removal units, such as the Big Dipper. As seen in FIG. 1, such active units include a container 30 that receives effluent from an inlet 31 and allows the flow rate to slow sufficiently that a F.O.G. mat 38 can collect on top of the grey water 40. The active unit has one or more rotating disks 32 formed of a plastic or like material to which F.O.G. contaminants are attracted. Typically, the rotation of the disk is in an at least partially immersed condition, which allows the oil 46 that floats on grey water 40 to cling to one or both sides of the disk so that contaminants are removed from the body of water upon rotation of the disk. Wipers 34 are typically used to scrape the F.O.G. from the opposite sides of the disk and channel them to a collection or disposal storage unit. Examples of such units are seen in U.S. Pat. Nos. 7,208,080, 7,186,346, and 6,491,830, all commonly assigned with this application and the relevant disclosures of which are hereby incorporated by reference.

Numerous advantages can result when the active separator is used with sensors that measure when a sufficient F.O.G. mat 38 is present in the container 30 to warrant operation of the active separator, and that avoid or terminate operation when not needed.

This type of control of the operation avoids wasted operation and it avoids operation for periods when operation is not needed. In some instances, a particularly heavy load of F.O.G. needs removal, and if the skimmer operates for a pre-set removal period, inadequate removal may be the result.

Also, by halting the removal of F.O.G. early enough, so as to always leave a slight layer of F.O.G. on the top of the water, the escape of foul odors from the water that would be exposed by complete removal of the F.O.G. can be avoided. As seen in FIG. 1 detector 12 is slightly below the static water line 46. By terminating operation as soon as the detector 12 senses water, rather than F.O.G., a slight F.O.G. mat remains above the grey water 40. This also avoids the release of humidity that can challenge the longevity of electronics and other gear of the separator.

A logic circuit can be provided to indicate a malfunction has occurred requiring service if the lower most sensor 14 continues to detect F.O.G. after separator operation for enough time that F.O.G. removal should be complete.

In the circuitry, a rate of rise of temperature of a probe that is immersed in F.O.G. will be greater than the rate of rise of a probe that is immersed in water. The ratio of the rate of rise of temperature in F.O.G. to rate of rise in water may often be on the order of 2 to 1. The ratio will be relatively constant over normal operating temperature ranges.

When a sufficiently thick level of F.O.G. is sensed by the lower probe 14, the electronics 18 can go through a predefined sequence. The first step is actuation of a heater 49 which is immersed in the water (as is conventional) to raise the temperature of the liquids so as to assure that the F.O.G. will be in a liquefied form. This can be followed by operation of the active skimmer 32, which continues until such time as the upper level thermocouple 12 begins to sense that it is immersed in water, rather than F.O.G., at which time the active skimmer is stopped. The signals to operate the skimmer can be comparable to those conventionally received from a timer for timer-operated skimmers.

If the rate of rise of temperature for either thermocouple is extraordinarily fast, logic in the electronics 18 can sense that the thermocouple is in air, rather than in F.O.G. or water. Suitable logic can be provided to deal with that circumstance. In particular, for a F.O.G. removal separator that is provided with an automatic solids transfer unit (such as is shown in U.S. Pat. No. 6,491,830 or 5,360,555) the fact that the sensor is in air indicates that the automatic solids transfer unit should not operate.

The provision of the sensors enables the elimination of the conventional electromechanical timer as the control of when to turn on the skimmer. If desired, a timer can be used to determine when to send sensing voltage to the probes. Also, in some instances the collection canister for removed F.O.G. is of a limited capacity, so that allowing F.O.G. to be directed to the canister from the skimmer for an unspecified period of time risks overflowing the canister. In such cases it may be preferable to use a timer to terminate skimming after a predefined time interval, although skimming starts when a thermocouple senses F.O.G. In such installations, only the one thermocouple is needed.

F.O.G. removal can also be obtained with more passive equipment such as a grease trap or an apparatus as described in U.S. patent application Ser. No. 11/413,034, filed Apr. 27, 2006, published as 2007/0251879-A1, issued as U.S. Pat. No.

Figure 2:
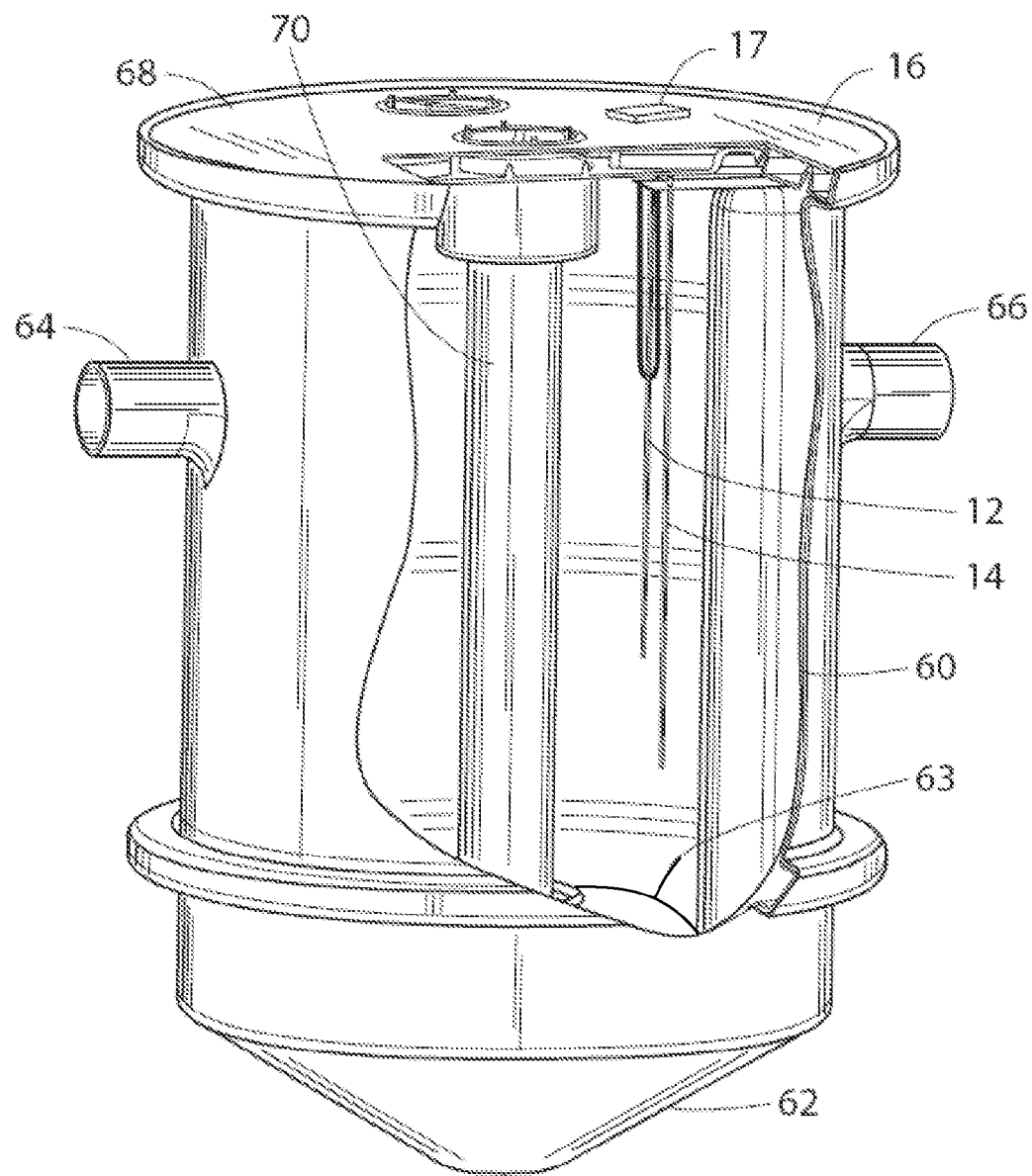
FIG. 2 is a schematic view of a passive separator equipped with an embodiment of the invention.
Figure 3:
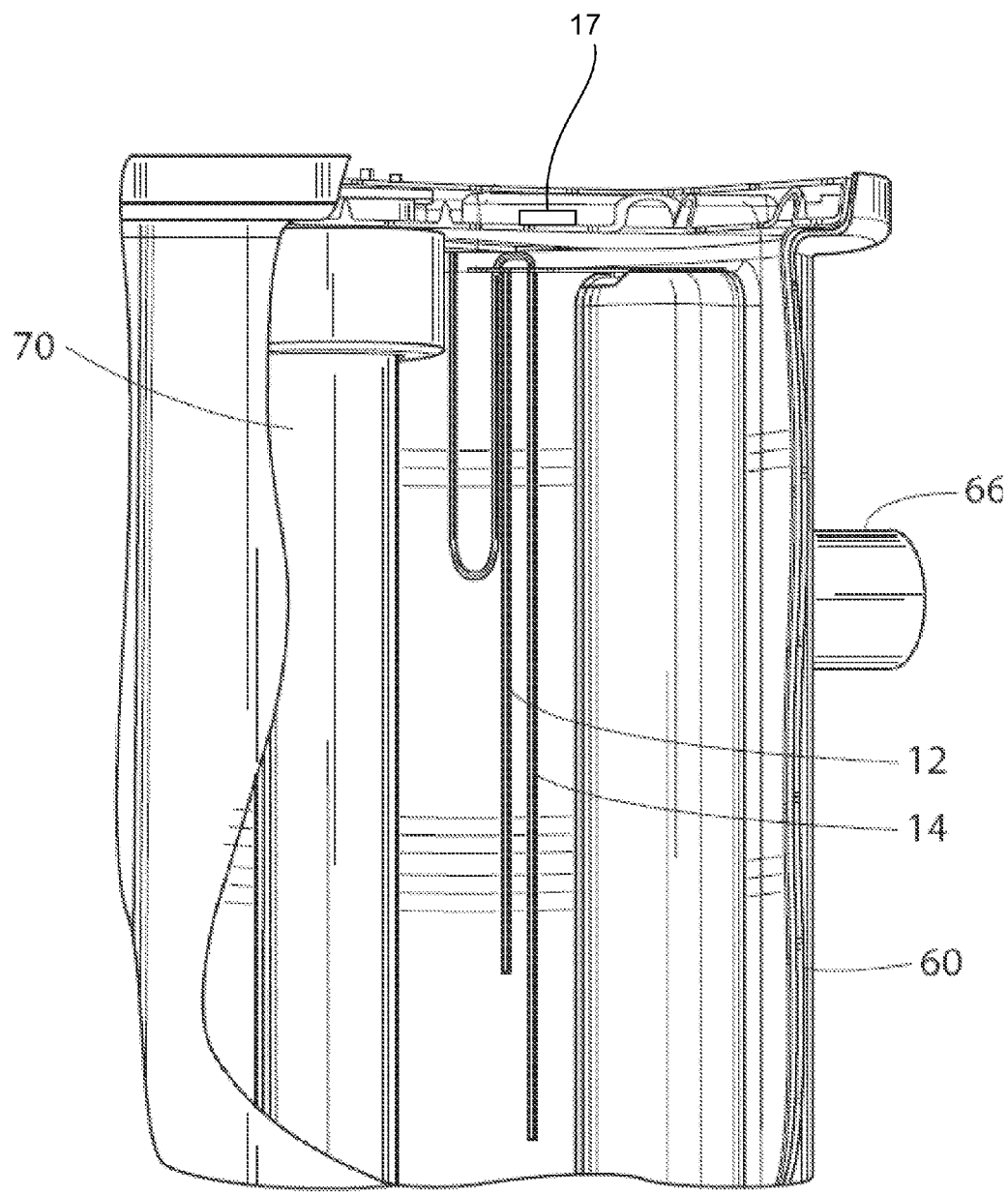
FIG. 3 is a schematic view of the embodiment of FIG. 2.

7,367,459 and commonly assigned with this application. The relevant disclosure of U.S. Pat. No. 7,367,459 is hereby incorporated by reference. That patent describes a F.O.G. trap for separating F.O.G. and solid waste from waste water. An example is seen in FIGS. 2 and 3 of this application. The F.O.G. trap includes a tank 60 having a conically shaped bottom 62. A divider 63 divides the tank into an upper chamber and a lower chamber. A hole (not shown in the FIG. 2 or 3) near an upper part of the divider 63 allows F.O.G. to rise into the upper chamber. An inlet invert 64 in the tank receives incoming waste water, while an outlet invert 66 removes water from the tank. A lid 68 covers the tank. A pipe 70 extends through the lid, upper chamber, and the divider for pumping solid waste out of the lower chamber, as well as the F.O.G.s, most grey water having passed through the outlet invert 66.

Two vertical rods 12 and 14 supported by lid 68 have the heater/thermocouple assemblies in their lower 1 to 2 inches. The remainder of the column lengths of the rods is made up of conduit for carrying the wires to the top and for supporting the heater/thermocouple at the correct depth within the tank. The longer rod 14 preferably terminates at the level where the tank is considered to be 75% full of F.O.G., and the shorter one is at the 50% level. Other locations can be used. The power and thermocouple wires come from the top of the rods and connect through connector 17 to allow for periodic connection on the outside of the unit to the "output box" (not shown). The output box, described below, is in the possession of a sewer official or other person assessing the condition of the unit. The wiring from the rods to the connector 17 is preferably sufficiently long to allow the lid 68, to be removed and for the addition of expansion collars. The preferred thermocouple is available from Watlow Electric Manufacturing Company, 12001 Lackland Road, St. Louis, Mo., USA 63146 as their Firerod Internal thermocouple, Style A.

Figure 4:
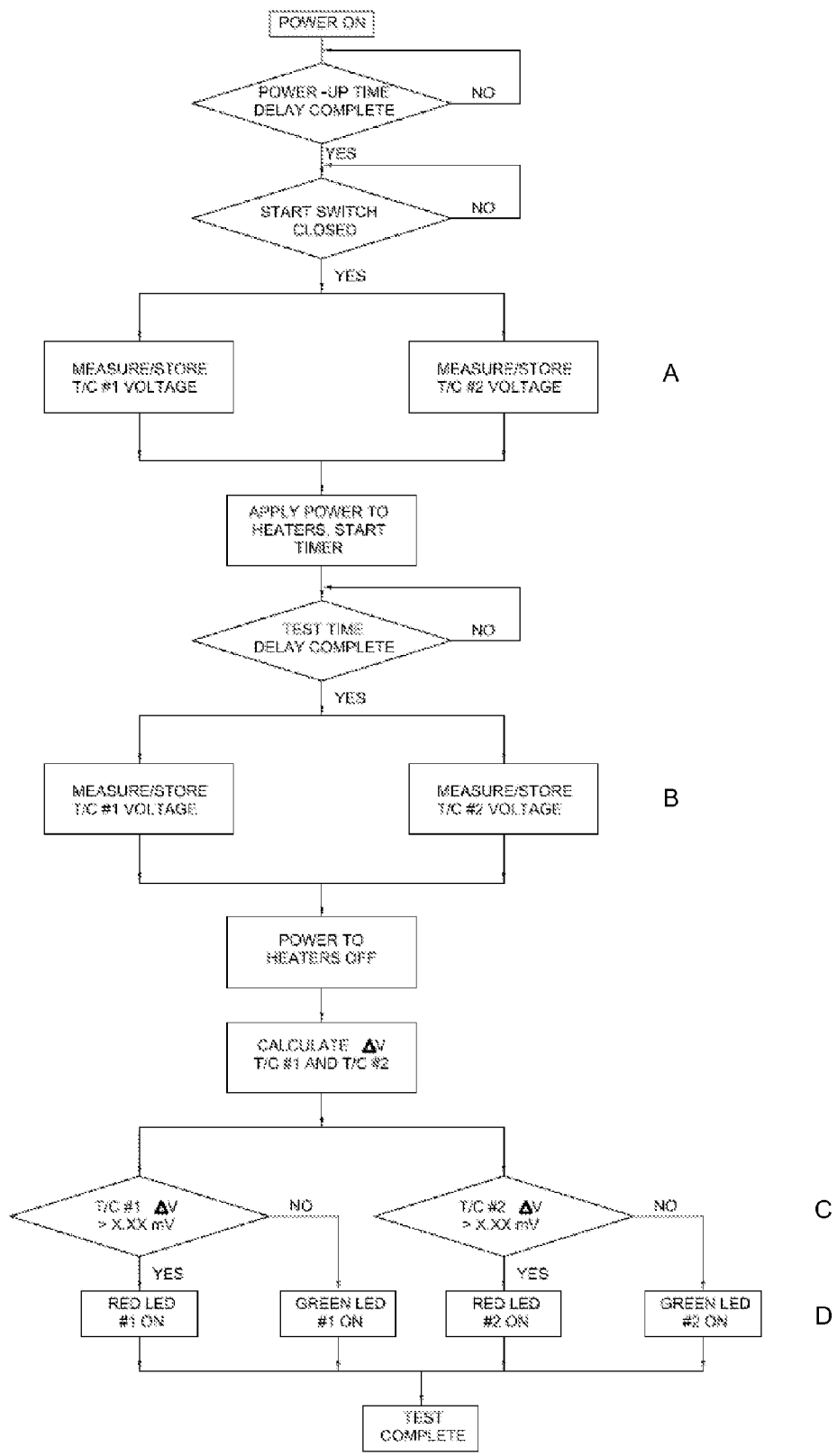
FIG. 4 is a flowchart of control operation.

FIG. 4 is a flow chart for the process which will determine if the tips of the probes are in water or oil (i.e. greater or lower heater and thermocouple temperature and therefore greater or lower thermocouple voltage). This flow chart can be carried out with various electrical circuits for the "output box" that the sewer official will carry to the F.O.G. separator to assess its condition. The logical flow can also be used in control box 18 to generate control signals for operation of the system of FIG. 1.

In the process, the voltages of the two thermocouples are measured at stage A and again at stage B, with power being supplied to the heaters between A and B. The changes in the voltages of the thermocouples are computed at stage C. If the voltage change exceeds a threshold (i.e. >x.xx mV), then an indication that the rate of rise was fast can be generated, such as by a lighting a red LED (stage D) or by supplying a "thermocouple is in F.O.G." signal to a controller. A voltage change below the threshold indicates that the thermocouple is in water and a green LED can be lit or a thermocouple is in water" signal can be sent to the controller. If the voltage is over a higher threshold, similar logic can indicate that the thermocouple is in air. The threshold, of course, is determined for each separator design based upon geometry and the length of time the heaters stay on and the time between voltage readings. Applicants have used heaters of 50 and 200 watts and time intervals of ten seconds, but a wide range of other values would be suitable. Time intervals measured on the order of milliseconds can be used.

Figure 5:
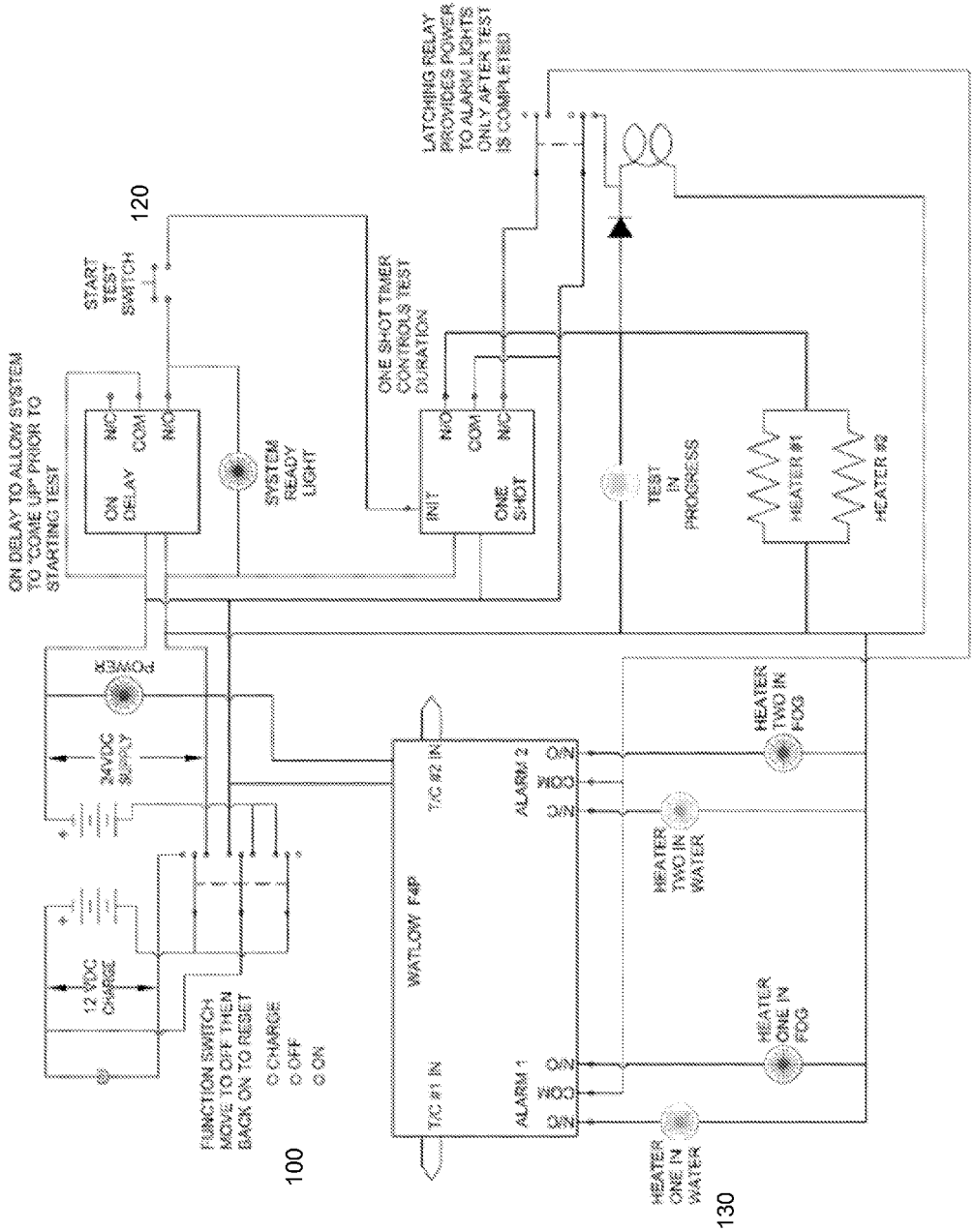
FIG. 5 is a schematic view of an electrical circuit for embodiments of the invention.

FIG. 5 is a schematic for such an output box, showing components that could be used in the output box—several switches, additional lights, relays, batteries, charging capability, etc. Those of ordinary skill in the art can construct such electronics or others that yield comparable results.

In use, the sewer official would take an output box with a charged battery to the site where the separator is installed. He/she connects a cable from the output box to the connector 17 of the separator. He/she turns the power on the box at 100, gets a power light (then possibly a ready light), presses a test push button 120, and after about 15-20 seconds gets the red/green status lights 130. This accomplishes one heating and measurement cycle (for the two probes) and is all that is required. He/she can tell from the combination of lights whether the separator needs to be pumped out or not according to this logic diagram:

| 50% full Sensor 12 | Senses F.O.G. | Senses F.O.G. | Senses Water |
|---|---|---|---|
| 75% full sensor 14 | Senses Water | Senses F.O.G. | Senses Water |
| Action for FIG. 2-3 | Pumping Recommended | Pumping Immediately | No Pumping Needed |

The counterpart logic for the active separator of FIG. 1 may be:

| Sensor 12 | Senses F.O.G. | Senses F.O.G. | Senses Water |
|---|---|---|---|
| Sensor 14 | Senses Water | Senses F.O.G. | Senses Water |
| Action | No skimming needed | Skim | No Skimming Needed |

In both embodiments, if the temperature rise indicates that a thermocouple is in air, pumping or skimming is inappropriate. If both are in air, a repair may be needed.

Certain modifications and improvements will occur to those skilled in the art upon reading the foregoing description. For example, the positioning of the thermocouple and heater in the separator can be accomplished by means other than separate rods; the two sensors could both be positioned space along a single rod or they can be mounted to other items at appropriate locations within the tank. It should be understood that all such modifications and improvements have been omitted for the sake of conciseness and readability, but are properly within the scope of the following claims.

What is claimed is:

1. In a separator tank for separating F.O.G. from an effluent that contains F.O.G. in which the tank has a size to enable stratification of a layer of F.O.G. present in the tank on water in the tank, the method comprising in sequence:

taking a first measure of the temperature of two thermocouples in the tank, applying heat to the two thermocouples in the tank for a fixed period of time, taking a second measure of the temperature of two thermocouples in the tank, evaluating differences in the first and second measures of the temperature for the two thermocouples, and for each thermocouple, if the difference in the first and second measures of the temperature for that thermocouple is below a threshold, generating a signal indicative that the thermocouple is immersed in water in the tank; and if the difference in the first and second measures of the temperature for that thermocouple exceeds the threshold, generating a signal indicative that the thermocouple is immersed in F.O.G.

2. A method as claimed in claim 1 wherein generating the signal indicative that the thermocouple is immersed in F.O.G. further comprises sending a maximum F.O.G. accumulation alarm.

3. A method as claimed in claim 2 wherein sending a maximum F.O.G accumulation alarm further comprises sending the maximum F.O.G. accumulation alarm to a remote indicator.

4. A method as claimed in claim 1 wherein taking the measures comprise measuring a voltage across the thermocouple.

5. A method as claimed in claim 1 wherein if the difference in the first and second measures of the temperature for that thermocouple exceeds a second threshold that is higher than the threshold mentioned in claim 3, generating a signal indicative that the thermocouple is immersed in air.

6. A method as claimed in claim 5 further comprising signaling an alarm in response to a signal indicative that one of the thermocouples is immersed in air.

7. A method as claimed in claim 1 further comprising operating a skimmer to skim F.O.G. from water in the tank in response to a signal indicative that both of the thermocouples are immersed in F.O.G.

8. A method as claimed in claim 1 further comprising directing the flow of effluent from the tank based upon the signal generated.

9. A method as claimed in claim 1 further comprising
removably coupling an output box to an electrical connector on the tank to input a current to a heater in the tank and to measure output voltages of the thermocouples, and
wherein evaluating differences in the first and second measures of the temperature for the two thermocouples is accomplished using the output voltages at the output box.

10. In a separator tank for separating F.O.G. from an effluent that contains F.O.G. in which the tank has a size to enable stratification of a layer of F.O.G. present in the tank on water in the tank, the method comprising in sequence:
taking a first measure of the temperature of at least one thermocouple in the tank, applying heat to the at least one thermocouple in the tank for a fixed period of time, taking a second measure of the temperature of the at least one thermocouple in the tank,
evaluating differences in the first and second measures of the temperature for the at least one thermocouple, and
if the difference in the first and second measures of the temperature for the at least one thermocouple is below a first threshold, generating a signal indicative that the at least one thermocouple is immersed in water in the tank; and if the difference in the first and second measures of the temperature for the at least one thermocouple exceeds the first threshold, generating a signal indicative that the at least one thermocouple is immersed in F.O.G.

11. A method as claimed in claim 10 wherein if the difference in the first and second measures of the temperature for the at least one thermocouple exceeds a second threshold that is higher than said first threshold, generating a signal indicative that the at least one thermocouple is immersed in air.

12. A method as claimed in claim 10, wherein generating the signal indicative that the thermocouple is immersed in F.O.G. further comprises sending a maximum F.O.G. accumulation alarm.

13. A method as claimed in claim 12, wherein sending a maximum F.O.G accumulation alarm further comprises, sending the maximum F.O.G. accumulation alarm to a remote indicator.

14. A method as claimed in claim 10, further comprising directing the flow of effluent from the tank based upon the signal generated.

15. A method as claimed in claim 10, further comprising
removably coupling an output box to an electrical connector on the tank to input a current to a heater in the tank and to measure output voltages of the at least one thermocouple, and
wherein evaluating differences in the first and second measures of the temperature for the at least one thermocouple is accomplished using the output voltages at the output box.

16. In a separator tank for separating F.O.G. from an effluent that contains F.O.G. in which the tank has a size to enable stratification of a layer of F.O.G. present in the tank on water in the tank, the method comprising in sequence:
taking a first measure of the temperature of two thermocouples in the tank, applying heat to the two thermocouples in the tank for a fixed period of time, taking a second measure of the temperature of the two thermocouples in the tank,
evaluating differences in the first and second measures of the temperature for the two thermocouples,
for each thermocouple, if the difference in the first and second measures of the temperature for that thermocouple is below a threshold, generating a signal indicative that the thermocouple is immersed in water in the tank; and if the difference in the first and second measures of the temperature for that thermocouple exceeds the threshold,
generating a signal indicative that the thermocouple is immersed in F.O.G.,
sensing the signal in a control box to determine if the thermocouples are surrounded by F.O.G. or water, and
if at least one of the thermocouples is determined to be in F.O.G., operating a skimmer to remove F.O.G.

17. A method as claimed in claim 16, wherein sensing the signal in a control box determines if the thermocouples are surrounded by air, F.O.G. or water.

* * * * *